United States Patent [19]

Nordvall

[11] Patent Number: 4,825,709
[45] Date of Patent: May 2, 1989

[54] MAGNETOELASTIC FORCE TRANSDUCER

[75] Inventor: Jan O. Nordvall, Västerås, Sweden

[73] Assignee: ASEA Aktiebolag, Västerås, Sweden

[21] Appl. No.: 131,428

[22] Filed: Dec. 10, 1987

[30] Foreign Application Priority Data

Dec. 15, 1986 [SE] Sweden ................................ 8605378

[51] Int. Cl.$^4$ .............................................. G01L 1/12
[52] U.S. Cl. ................................................ 73/862.69
[58] Field of Search ................... 73/862.69, 779, 1 B, 73/DIG. 2; 336/20

[56] References Cited

U.S. PATENT DOCUMENTS

| 1,906,551 | 5/1933 | De Forest | 73/779 |
| 4,193,294 | 3/1980 | Forslund et al. | 73/862.69 |

FOREIGN PATENT DOCUMENTS 899169 9/1983 European Pat. Off. .
151267 8/1955 Sweden .

Primary Examiner—Charles A. Ruehl
Attorney, Agent, or Firm—Watson, Cole, Grindle & Watson

[57] ABSTRACT

A magnetoelastic force transducer is made of two identical, cylindrical bodies of magnetic material which are held together by means of a stud bolt. In an axially extending and concentrically located inner space there is placed a bobbin with two measuring windings, connected in opposition, and an excitation winding supplied with alternating current. The interior of the transducer is shaped such that a thin cylindrical tubular wall is formed immediately opposite to the respective measuring winding in each one of the bodies. When the transducer is force-loaded via the stud bolt, a compressive stress arises in one of these tubular walls and a tensile stress arises in the other tubular wall. This influences the magnetic conditions such that a signal is obtained from the measuring windings which is proportional to the applied force. In order to eliminate a possible measuring signal at zero applied force, means is provided to move the bobbin in the axial direction. A natural prestress can be imparted to the core with the aid of a built-in spring means and an adjusting screw.

12 Claims, 1 Drawing Sheet

MAGNETOELASTIC FORCE TRANSDUCER

TECHNICAL FIELD

The present invention relates to a magnetoelastic transducer for force measurement. The invention relates particularly to a transducer which is provided with means for mechanical neutral point compensation of its measuring output. Magnetoelastic transducers in general are widely used in modern engineering and other industries where there is a need for force measurement.

BACKGROUND ART

Magnetoelastic force transducers are previously known from, for example, Swedish Patent No. 151 267. Such a transducer comprises a force-subjected magnetic core built up of magnetoelastic sheets, which core is provided with four through-holes for two windings located perpendicular one to the other, one winding being an excitation winding adapted to be connected to an a.c. source for generating a magnetic flux in the core, and the other winding being a measuring winding for sensing the magnitude of the magnetic flux passing through the measuring winding. The magnitude of this flux depends on the magnitude of the external force applied to the core.

Transducers of the above-mentioned type often suffer from linearity and zero voltage problems. The linearity can be improved by constructing the transducer with two measuring portions, for example in the manner described in U.S. Pat. No. 4,193,294, one portion being substantially subjected to tensile stress and the other being subjected to compressive stress, both stresses being proportional to the external force. A good linearity can then be attained by summing the respective signals from the measuring portions in suitable proportions.

The zero voltage of a magnetoelastic transducer is the phenomenon of a finite output voltage when there is no input force and is caused by internal stresses and crystal orientation in the sheet material of the core, which have arisen, inter alia, during the manufacturing processes of the sheet material, for example during rolling.

Published European Patent Application No. 0,089,916 shows an embodiment of a magnetoelastic transducer with a specially formed sheet section with a measuring part formed as a doubly-bent beam. This transducer exhibits extremely good linearity and low zero voltage values.

In many applications nowadays it is a requirement that the output signal of a force transducer should be zero at zero applied force. Also, for safety reasons it is often a requirement that a residual zero voltage must not be electrically compensated for, since in the event of an electricity supply failing, offsetting a zero voltage may have serious consequences.

In connection with the manufacture of any device and thus a magnetoelastic transducer, it is greatly to be desired that the device should be simple to manufacture and should not require too high a degree of precision.

According to the invention described in the U.S. patent application Ser. No. 130,545, filed Dec. 9, 1987 the transducer has a core of magnetic material made from two cylindrical and identical bodies which are held together with the aid of a stud bolt. In an axially and concentrically inner space there is located a bobbin supporting two measuring windings and one excitation winding adapted to be supplied with alternating current. The interior of the transducer core is formed such that, adjacent to the respective measuring winding in each one of the bodies, there is provided a thin cylindrical tubular wall of magnetic material. When the transducer core is influenced by an external force via the stud bolt, a compressive stress arises in one of these tubular walls and a tensile stress arises in the other tubular wall. In a known manner these stresses influence the magnetic conditions in the core in such a way that a signal, proportional to the applied force, is obtained from the measuring windings which are electrically connected together in opposition.

Excellent though the transducer described above is in many respects, it does have a limited performance as regards its ability to generate a zero signal at zero applied force. With the arrangement described in the aforesaid copending U.S. patent application therefore, the feasible fields of application are limited. Since the design is simple and is favourable from the point of view of ease of manufacture, it would be desirable to be able to improve the zero voltage performance in some way. The present invention relates to a design which corresponds broadly to the disclosure of the aforesaid copending U.S. patent application but which has a considerably improved zero voltage performance.

DISCLOSURE OF THE TYPE OF TRANSDUCER TO WHICH THE INVENTION RELATES

A magnetoelastic transducer according to the invention has a core of magnetic material made from two cylindrical and identical bodies. Extending from a first circular end surface of each body a first axial center hole is provided which has an axial length somewhat shorter than the length of the cylindrical body. The first axial center hole is provided with an internal screw thread. A second axial center hole with a diameter smaller than that of the above-mentioned first center hole is formed in the remaining central part of the cylindrical body. This second hole is also provided with an internal screw thread.

Extending from the other (or second) circular end surface of each cylindrical body, a concentric, tubular space is provided having an axial length somewhat shorter than the length of the body. The inner diameter of the tubular space is chosen such that a thin cylindrical tubular wall is formed between this space and the first axial center hole.

The two identical cylindrical bodies are now connected together with their second ends confronting in such a way that the two tubular spaces are facing each other. The connecting together is performed by means of a stud bolt with a shank diameter adapted to provide clearance in the respective first axial center hole and with a threaded bolt end dimension adapted to the threads of the smaller, second threaded axial center hole. The shank of the stud bolt has such a length that& it extends somewhat beyond the respective first circular end surface of the assembled transducer.

In the enclosed annular space that is formed when the two cylindrical bodies are connected together in the manner described there is placed a bobbin, the inner diameter of which is dimensioned to fit against the outer diameter of the two thin cylindrical tubular walls and the axial length of which is somewhat shorter than the entire axial length of the enclosed annular space. The bobbin is provided with two measuring windings wound around the bobbin in such a way that a different measuring winding will be located, in the axial direction, outside each of the two thin cylindrical tubular walls provided one by each of the two assembled cylindrical bodies. The bobbin is also provided with an excitation winding disposed around the outside of the two measuring windings and extending over the entire axial length of the bobbin.

From a magnetic point of view, the measuring windings are electrically connected in opposition which also means that the voltages induced in the windings by any change of flux in the core oppose one another, the total output voltage being approximately zero when the applied force is zero.

By placing the transducer on one first circular end surface against a fixed base and allowing the force which it is desired to measure to be applied to the shank of the stud bolt, a compressive stress is obtained in the thin cylindrical tubular wall which is positioned nearest to the base, and a tensile stress is obtained in the thin cylindrical tubular wall which faces the force-applying side This influences the magnetic conditions in a known manner for magnetoelastic transducers, and a signal proportional to the applied force can be obtained from the measuring windings.

The transducer can be adapted in a very simple way for measuring tensile forces. This can be done, for example, by providing the stud bolt with a loop or the like.

A magnetoelastic transducer according to the above will, with a fair probability, exhibit a certain residual voltage at zero applied force. Because of the design of the transducer core there are several possibilities for mechanical balancing and compensation of the zero signal.

DISCLOSURE OF THE INVENTION

As described above, the bobbin supporting the windings has an axial length shorter than the axial length of the annular space in the core which receives it. According to this invention means is provided so that the bobbin can be moved, adjusted and fixed in the axial direction inside the transducer core so that a possible zero signal can be compensated for. Such an axial adjustment is generally sufficient and can most easily be performed by providing a further pair of threaded holes (e.g. diametrically disposed relative to the axis of the core) extending into the concentric tubular space of each body from the first end surface thereof. However this invention includes a further possibility for mechanical compensation. A spring means (e.g. a coil spring) whose prestress can be influenced by means of an adjusting screw having threads to mesh with the threads of the first centrally threaded hole not occupied by the stud bolt can be fitted into this hole. By prestressing the spring means to a smaller or greater extent, a suitable force is added, which counteracts the residual zero signal. Since the path of force of the spring is much longer than the compression of the transducer upon loading, the spring force will be changed only to a negligible extent when the transducer is subjected to load, i.e. the transducer has been loaded with a constant force.

Instead of using a coil spring, it is, of course, possible to use a suitable number of spring washers or other resilient member(s).

To prevent the stud bolt from disturbing the magnetic field configuration of the transducer, it is suitably made of a non-magnetic material.

BRIEF DESCRIPTION OF THE DRAWING

The invention will now be further described, by way example, with reference to the accompanying drawing, in which.

DESCRIPTION OF THE PREFERRED EMBODIMENTS

Figure 1:
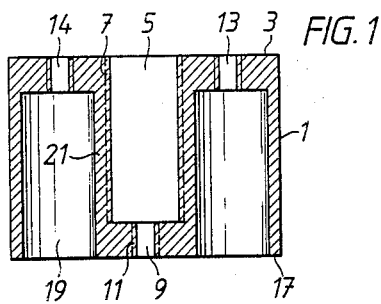
FIG. 1 shows the first of two identical, cylindrical bodies that included in a magnetoelastic force transducer to the invention.
Figure 3:
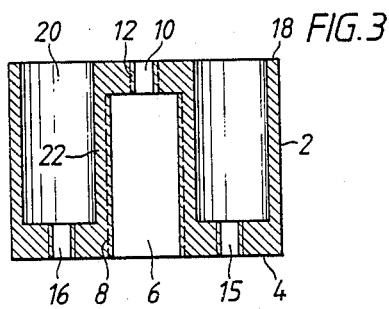
FIG. 3 shows the second of the two identical, cylindrical bodies that are included in the magnetoelastic transducer according to the invention.

The construction of a magnetoelastic force transducer according to the invention will be clear from a study of the accompanying drawing. FIGS. 1 and 3 show two identical, cylindrical bodies 1 and 2 which together provide the magnetic core of the transducer and are thus fabricated from an appropriate magnetoelastic material. First axial center holes 5 and 6 are formed in the bodies 1 and 2 and these extend from respective circular end surfaces, the axial length or axial depth of these holes 5, 6 being somewhat shorter than the axial length of the respective cylindrical body 1 or 2. It will also be clear from FIGS. 1 and 3 that these center holes 5 and 6 have been provided with internal screw threads 7 and 8. Second axial center holes 9 and 10 each with a smaller diameter than that of the first center holes 5, 6 have been made in the remaining central core. The holes 9 and 10 are also provided with internal screw threads (11 and 12).

Extending from the circular end surface 3 and 4 of each body (the first end surfaces), two diametrically disposed and concentrically threaded holes 13, 14 and 15, 16, respectively are provided.

Extending from the respective second end surfaces 17 and 18 of each cylindrical body 1 and 2, concentric annular spaces 19 and 20 are provided, the axial length of each of these spaces being somewhat shorter than the length of the cylindrical bodies 1 and 2. In this way, a thin cylindrical tubular wall 21 and 22, respectively, is framed between the hollow spaces 5, 19 in body 1 and 6, 20 in body 2.

Figure 2:
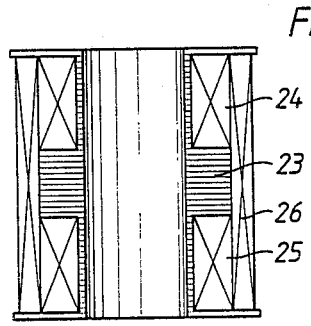
FIG. 2 shows a bobbin on which two measuring windings and one excitation winding of the transducer are wound.

FIG. 2 shows a cylindrical bobbin 23 on which measuring windings 24 and 25 and an excitation winding 26 are wound. The inner diameter of the bobbin 23 is dimensioned to be a slide fit against the outer surface of the cylindrical tubular walls 21 and 22.

Figure 4:
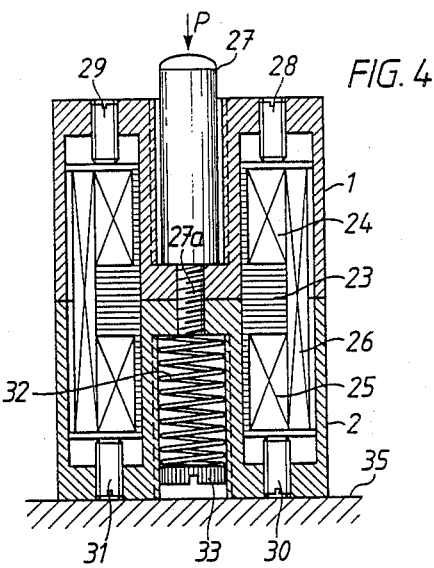
FIG. 4 shows how the component parts of FIGS. 1, 2 and 3 are assembled to form a magnetoelastic transducer according to the invention.

FIG. 4 shows how a magnetoelastic force transducer according to the invention is assembled from the cylindrical bodies 1 and 2 and the bobbin 23. To keep the two cylindrical bodies 1, 2 pressed against each other, the mounting is performed with the aid of a stud bolt 27, to which the force P to be measured is applied. The shank diameter of the stud bolt 27 is adapted to provide clearance in one of the center holes 5 or 6 (in hole 5 as shown in FIG. 4) and the stud bolt 27 has a reduced diameter end portion 27a provided with a screw thread corresponding to the threads 11 and 12 in the holes 9 and 10. The stud bolt can be made of non-magnetic material.

In use, the force transducer is stood (surface 4 on a base support 35) so that the force to be measured loads the core inducing a tensile stress in wall 21 and a compressive stress in wall 22. For measuring a tensile force, as mentioned above the stud bolt 27 can be provided with a loop or the like (not shown).

For adjusting and fixing the bobbin 23 in the annular space 19/20, adjusting screws 28, 29, 30 and 31 are used. First, a rough adjustment of the axial positioning of the bobbin 23 is made, so that the measuring windings 24, 25, which are each adapted to be positioned in a reactive one of the two bodies 1, 2 are placed to surround the concentric cylindrical tubular walls 21/22 which are formed respectively between the first central and axial holes and the inner concentric tubular space in each body. The final axial position of the bobbin 23 in the transducer core is determined during a calibration procedure carried out on the transducer. The position of he bobbin is adjusted axially until the output signal of the transducer at zero applied force becomes zero, until the output signal acquires a minimum value.

Although diametrically located holes 13, 14 and 15, 16 are described, since their purpose is to receive screws to adjust the axial position of the bobbin it will be appreciated a different arrangement and/or number of holes is clearly possible.

When it is essential that there be zero residual voltage, a spring 32 can be located in the hole 6 for further fine adjustment. Prestressing of the spring is performed by an adjusting screw 33 threaded into the center hole 6. As shown in FIG. 4 the spring 32 consists of a coil spring but a number of spring washers or other resilient member(s) can be used in the hole 6.

Figure 5:
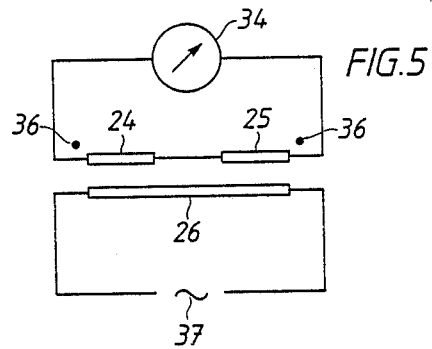
FIG. 5 shows a wiring diagram for the windings included in the transducer of FIG. 4.

The manner in which the windings are energised is shown in FIG. 5. The dots 36 indicate the measuring windings 24, 25 are connected in opposition as is conventional in force transducers of this type. The excitation winding 26 is connected to an a.c. source 37, and in the usual manner with a magnetoelastic force transducer, generates the magnetic flux in the core parts 1 and 2, the force distortion of which is sensed by the windings 24, 25. An electrical output signal, proportional to the applied force P, is generated in the windings 24 and 25 and is fed to a current- or voltage-sensing instrument 34, which, after calibration, is used for reading the force applied at each particular time. The instrument can be calibrated directly in force units.

The basic design of the force transducer is clear from FIG. 4. Within the scope of the invention, possibilities are provided for supplementing and changing constructive elements to a certain extent. To guide the shank of the stud bolt 27, the threaded hole 5 (or 6), which is threaded only because of a desire to make the two bodies 1 and 2 identical, can be provided with a bearing bushing (not shown) of a suitable low friction material.

What is claimed is:

1. A magnetoelastic force transducer comprising a core of solid magnetoelastic material defining a closed magnetic circuit, an excitation winding surrounding part of said core and adapted to be fed with alternating current for generating a magnetic flux in the core and two measuring windings each surrounding parts of the core and adapted together to sense changes in the magnetic flux in the core when the latter is loaded with a force to be measured, characterised in that the closed core includes two hollow cylindrical bodies each having outer and inner end faces which bodies are connected together over their, inner faces to provide an inner annular space, a bobbin, on which the measuring windings and the excitation winding are wound located in said annular space, first holes extending axially from the outer end faces of the cylindrical bodies, the axial length of each said first hole being shorter than the axial length of the respective body a second hole extending from the inner end face of each cylindrical body and communicating with, the respective first hole, a force transmitting member inserted in one of said first holes and both of said second holes for securing together said two bodies, the diameter of said first hole in which the said member is located being greater than the diameter of the said member to provide clearance around the said member in said first hole, said second holes being provided in a central part of the bodies where said inner faces of the two bodies are in contact, and means to adjust the position of the bobbin within the annular space.

2. Magnetoelastic force transducer according to claim 1, in which the means to adjust the position of the bobbin in the said annular space includes holes formed in the first surface of at least one of the two bodies, which holes receive screw-threaded bobbin-adjusting members.

3. A magnetoelastic force transducer according to claim 2, in which the bobbin with windings is arranged, with the aid of the adjusting members, to be moved in the axial direction of the core in such a way that each measuring winding can be located around a respective one of the two concentric, cylindrical tubular walls which are formed between the respective first axial holes and the inner concentric, tubular spaces in the two bodies.

4. A magnetoelastic force transducer according to claim 3, wherein a spring means and an adjusting screw are located in the one of the central holes not occupied by the force-transmitting member and the adjusting screw is adapted to prestress the spring means to such a degree that the output voltage of the transducer, in the case of an excited excitation winding and zero applied force at least approaches zero.

5. A magnetoelastic force transducer according to claim 2, in which the two cylindrical bodies making up the closed core are identical.

6. A magnetoelastic force transducer according to claim 2, wherein a spring means and an adjusting screw are located in the one of the central holes not occupied by the force-transmitting member and the adjusting screw is adapted to prestress the spring means to such a degree that the output voltage of the transducer, in the case of an excited excitation winding and zero applied force at least approaches zero.

7. A magnetoelastic force transducer according to claim 1, wherein the adjusting means allow the position of the bobbin in the core to be adjusted into and fixed in an axial position where the output voltage of the transducer, in the case of an excited excitation winding and zero applied force, has a minimum value.

8. A magnetoelastic force transducer according to claim 1, wherein a spring means and an adjusting screw are located in the one of the central holes not occupied by the force-transmitting member and the adjusting screw is adapted to prestress the spring means to such a degree that the output voltage of the transducer, in the case of an excited excitation winding and zero applied force at least approaches zero.

9. A magnetoelastic force transducer according to claim 1, wherein the excitation winding on the bobbin extends in the axial direction of the core over the entire axial length of the bobbin.

10. A magnetoelastic force transducer according to claim 1, wherein the force-transmitting member is a stud bolt made of a non-magnetic material and its shank is longer than the length of the first axial hole in which it is located.

11. A magnetoelastic force transducer having a magnetic core formed from two identical, cylindrical bodies which are held together and define an axially extending and concentrically located inner space, a bobbin located in said inner space and supporting two measuring windings connected in opposition, and an excitation winding supplied with alternating current, the interior of the transducer core being shaped such that a thin cylindrical tubular wall is formed immediately opposite to the respective measuring winding in each one of said two cylindrical bodies a force-transmitting means extending axially of said two cylindrical bodies and holding said two cylindrical bodies together in the vicinity of said tubular walls, whereby when the transducer is influenced, via the said member, by an externally applied force, a compressive stress is arises in one of said tubular walls and a tensile stress arises in the other of said tubular walls to influence the magnetic conditions in the core such that a signal is obtained from the measuring windings which is proportional to the applied force, means being further provided to adjustably set the position of the bobbin within the interior of the core to minimise the output voltage of the force transducer in the face of a zero force.

12. A force transducer as claimed in claim 11, which further includes means to resiliently prestress to an adjustable degree the stress in one of said tubular walls when there is no force applied to the force-transmiting member.

* * * * *